(12) United States Patent
Bhamidipaty et al.

(10) Patent No.: US 12,406,142 B2
(45) Date of Patent: Sep. 2, 2025

(54) SITUATIONAL AWARENESS BY FUSING MULTI-MODAL DATA WITH SEMANTIC MODEL

(71) Applicant: INTERNATIONAL BUSINESS MACHINES CORPORATION, Armonk, NY (US)

(72) Inventors: Anuradha Bhamidipaty, Yorktown Heights, NY (US); Elham Khabiri, Briarcliff Manor, NY (US); Shuxin Lin, Yorktown Heights, NY (US); Jeffrey Owen Kephart, Cortlandt Manor, NY (US); Yingjie Li, Chappaqua, NY (US); Bhavna Agrawal, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 16/933,964

(22) Filed: Jul. 20, 2020

(65) Prior Publication Data

US 2022/0019742 A1    Jan. 20, 2022

(51) Int. Cl.
*G06F 40/30* (2020.01)
*G06F 40/295* (2020.01)
*G06N 5/02* (2023.01)

(52) U.S. Cl.
CPC ............ *G06F 40/30* (2020.01); *G06F 40/295* (2020.01); *G06N 5/02* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 6,556,983 B1 * 4/2003 Altschuler ............ G06F 16/907
707/E17.011
7,539,697 B1 * 5/2009 Akella ................ G06F 16/9024
707/999.102

(Continued)

FOREIGN PATENT DOCUMENTS

CN    102682122 A    9/2012
CN    104182454 B    3/2018

(Continued)

OTHER PUBLICATIONS

Blanco et al., title={Early integration testing for entity reconciliation in the context of heterogeneous data sources}, journal={IEEE Transactions on Reliability}, volume={67}, number={2}, pages={538--556}, year={2018}, publisher={IEEE} (Year: 2018).*

(Continued)

*Primary Examiner* — Lamont M Spooner
(74) *Attorney, Agent, or Firm* — CHIP LAW GROUP

(57) ABSTRACT

A method is provided for creating a semantic model for submitting search queries thereto. The method includes an act of receiving data from one or more input sources in an entity and relationship capture service of a situational awareness engine. The method further includes an act of extracting entities and relationships between the entities in two or more extraction services, where the two or more extraction services include at least two of a table-to-graph service, an event-to-graph service, a sensor-to-graph service, a text-to-graph service, and an image-to-graph service. The method includes an act of generating a semantic model based on fusion and labeling the extracted data provided by the at least two extraction services, where the semantic model can receive a search query and respond to the search query based on the generated semantic model.

18 Claims, 5 Drawing Sheets

(56) References Cited

U.S. PATENT DOCUMENTS

| | | | |
|---|---|---|---|
| 7,877,421 B2 | 1/2011 | Berger et al. | |
| 7,877,726 B2 | 1/2011 | Sabbouh | |
| 7,966,291 B1* | 6/2011 | Petrovic | G06F 16/289 |
| | | | 707/808 |
| 7,996,291 B2* | 8/2011 | Baiye | G06Q 40/02 |
| | | | 705/36 R |
| 9,389,681 B2* | 7/2016 | Sankar | G06F 16/213 |
| 9,406,018 B2 | 8/2016 | Upadhyaya et al. | |
| 9,785,696 B1* | 10/2017 | Yakhnenko | G06F 16/30 |
| 9,805,255 B2* | 10/2017 | Yang | G06F 18/2163 |
| 10,339,130 B2* | 7/2019 | Taylor | G06F 16/2228 |
| 10,360,507 B2 | 7/2019 | Aravamudan et al. | |
| 10,482,178 B2 | 11/2019 | Rajpathak et al. | |
| 10,559,180 B2 | 2/2020 | Pourmohammad et al. | |
| 10,691,473 B2* | 6/2020 | Karashchuk | H04L 51/216 |
| 10,803,050 B1* | 10/2020 | Salkola | G06F 40/295 |
| 11,093,551 B1* | 8/2021 | Natarajan | H04L 51/18 |
| 2003/0229410 A1 | 12/2003 | Smith et al. | |
| 2007/0112718 A1 | 5/2007 | Liu et al. | |
| 2007/0118399 A1* | 5/2007 | Avinash | G16H 10/60 |
| | | | 705/2 |
| 2012/0245944 A1* | 9/2012 | Gruber | G10L 15/1815 |
| | | | 704/270.1 |
| 2013/0159350 A1* | 6/2013 | Sankar | G06F 3/017 |
| | | | 707/E17.005 |
| 2014/0115010 A1* | 4/2014 | Seth | G06F 16/9024 |
| | | | 707/798 |
| 2014/0200951 A1 | 7/2014 | Hampapur et al. | |
| 2014/0304251 A1* | 10/2014 | Bornea | G06F 16/9024 |
| | | | 707/718 |
| 2014/0365525 A1* | 12/2014 | Pfeifer | G06F 16/367 |
| | | | 707/777 |
| 2015/0006587 A1* | 1/2015 | Segaran | G06F 16/215 |
| | | | 707/798 |
| 2015/0019227 A1* | 1/2015 | Anandarajah | G10L 15/18 |
| | | | 704/257 |
| 2016/0004741 A1* | 1/2016 | Johnson | G06F 21/6218 |
| | | | 707/783 |
| 2016/0203130 A1* | 7/2016 | Roque | G06F 40/205 |
| | | | 707/741 |
| 2016/0299959 A1* | 10/2016 | Sankar | G06F 3/038 |
| 2016/0378861 A1* | 12/2016 | Eledath | G06V 20/52 |
| | | | 707/766 |
| 2017/0200264 A1 | 7/2017 | Park et al. | |
| 2018/0232459 A1* | 8/2018 | Park | G06F 16/9024 |
| 2018/0357262 A1* | 12/2018 | He | G06F 16/285 |
| 2019/0205964 A1* | 7/2019 | Onoro Rubio | G06N 3/084 |
| 2019/0354574 A1* | 11/2019 | Wick | G06N 5/04 |
| 2019/0354883 A1 | 11/2019 | Aravamudan et al. | |
| 2019/0361851 A1* | 11/2019 | Rogynskyy | G06F 16/22 |
| 2020/0059481 A1* | 2/2020 | Sekar | H04L 63/1425 |
| 2020/0104365 A1* | 4/2020 | Guo | G06Q 50/18 |
| 2020/0364084 A1* | 11/2020 | Zheng | H04L 67/10 |
| 2020/0410012 A1* | 12/2020 | Moon | G06Q 10/04 |
| 2021/0192142 A1* | 6/2021 | Feng | G06F 16/483 |
| 2021/0201652 A1* | 7/2021 | Mondal | H04N 7/181 |
| 2021/0224324 A1* | 7/2021 | Fourney | G06F 16/367 |
| 2021/0319054 A1* | 10/2021 | Glass | G06N 3/08 |
| 2022/0179665 A1* | 6/2022 | Rathod | G06F 9/451 |
| 2023/0153355 A1* | 5/2023 | Crabtree | G06F 18/29 |
| | | | 706/45 |

FOREIGN PATENT DOCUMENTS

| | | |
|---|---|---|
| CN | 109739991 A | 5/2019 |
| WO | 2017144953 A1 | 8/2017 |

OTHER PUBLICATIONS

Zhao et al., title={Multi-source knowledge fusion: a survey}, journal={World Wide Web}, volume={23}, pages={2567--2592}, year={2020}, publisher={Springer} (Year: 2020).*

Ram, S. et al., "A Unifying Semantic Model for Accessing Multiple Heterogeneous Databases in a Manufacturing Environment"; IEEE (1991); pp. 212-215.

Lin, H. et al., "Manufacturing System Engineering Ontology for Semantic Interoperability Across Extended Project Teams"; International Journal of Production Research (2004); 38 pgs.

Zou, Y. et al., "Retrieving Similar Cases for Construction Project Risk Management Using Natural Language Processing Techniques"; Journal of Automation in Construction (2017); 41 pgs.

Tao, M. et al., "Ontology-Based Data Semantic Management and Application in IoT-Based Smart Home"; Future Generation Computer Systems (2017); vol. 76; pp. 528-539.

Bermudez-Edo, M. et al., "IoT-Lite: A Lightweight Semantic Model for the Internet of Things"; IEEE (2016); 8 pgs.

Schabus, S. et al., "Semantically Annotated Manufacturing Data to Support Decision Making in Industry 4.0: A Use-Case Driven Approach"; Research Gate (2017); 7 pgs.

Dagnely, P. et al., "Semantically Enriched Multi-level Sequential Pattern Mining for Exploring Heterogeneous Event Log Data." Intelligent Systems: Theory, Research and Innovation in Applications. Springer, Cham. (2020), pp. 203-222.

Saeidlou, S. et al., "Intelligent semantic query for manufacturing supply chain", Advances in Manufacturing Technology XXX (2016); pp. 419-424.

Baly et al., "Wafer Classification Using Support Vector Machines"; IEEE, 2012, pp. 373-383, vol. 25.

Disclosed Anonymously, IP.com No. IPCOM000249743D "Method and System for Prediction of Large Scale Conversion Rate (CVR) through Dynamic Transfer Learning of Global and Local Features", Mar. 30, 2017, 6 pages.

Garrett, Z. "Machine Learning to Predict Advertisement Targeting Solutions", Technical Disclosure Commons, Defensive Publications Series, 2017, 35 pages.

Khabiri et al., "Industry Specific Word Embedding and its Application in Log Classification"; CIKM, 2019, 9 pages.

Mell et al., "Recommendations of the National Institute of Standards and Technology"; NIST Special Publication 800-145, 2011, 7 pages.

Qiu et al., "Pre-Trained Models for Natural Language Processing: A Survey", Research Gate, 2020, 28 pages.

United States Non-Final Rejection dated Jul. 18, 2022, 16 pages, in U.S. Appl. No. 16/933,972.

United States Notice of Allowance dated Nov. 9, 2022, 10 pages, in U.S. Appl. No. 16/933,972.

Young et al., "Recent Trends in Deep Learning Based Natural Language Processing"; arXiv:1708.02709v8, 2018, 32 pages.

Zhang et al., "Machine Reading Comprehension: The Role of Contextualized Language Models and Beyond" arXiv:2005.06249v1 [cs.CL], 2020, 51 pages.

Pomp, et al., Applying Semantics To Reduce The Time To Analytics Within Complex Heterogeneous Infrastructures, Technologies, Sep. 2018, vol. 6, Issue 81, 29 pages.

Tan, et al., Enabling query processing across heterogeneous data models: A survey, IEEE International Conference on Big Data, Dec. 11-14, 2017, 10 pages.

Zhou, Q., Research On Heterogeneous Data Integration Model Of Group Enterprise Based On Cluster Computing, Cluster Computing, May 24, 2016, vol. 19, pp. 1275-1282.

Zhu, et al. "An Approach To Modeling And Discovering Event Correlation For Service Collaboration." International Conference on Service-Oriented Computing, Oct. 18, 2017, pp. 191-205.

* cited by examiner

SITUATIONAL AWARENESS BY FUSING MULTI-MODAL DATA WITH SEMANTIC MODEL

BACKGROUND

Technical Field

The present disclosure generally relates to situational awareness computer systems and software for use therewith, and more particularly, to methods and systems of fusing multiple sources of data using a semantic model with the intent of providing situational awareness in a complex operating environment.

Description of the Related Art

In many complex situations, the ability to provide system-wide visibility regarding the "state of the system" is a difficult, but core, functional requirement, and one that increasingly relies on the analysis of sensor and other forms of multi-modal data. Usually, Internet of Things (IoT) sensor data is available in a format that can be ingested readily by data analytics and machine learning algorithms. However, other sources of data, such as unstructured free text documents, including logs, reports, and process flow diagrams, are not easily amenable to direct machine learning and data analytics. These sources, however, can offer valuable information which, in conjunction with the sensor data, can be used for solving problems like failure prediction, root cause analysis, predictive maintenance, and the like.

One of the major challenges of integrating diverse databases is to hide the heterogeneity of the constituent databases from users. Some conventional approaches focus on how to support information autonomy that allows the individual team members to keep their own preferred languages or information models rather than requiring them all to adopt standardized terminology. Some ontology models provide efficient access by common mediated meta-models across all engineering design teams through semantic matching. Some approaches describe how the primitives of Web Ontology Language (OWL) can be used for expressing simple mappings between a mediated ontology model and individual ontologies. Many of these approaches require querying across multiple heterogeneous databases separately.

SUMMARY

According to various embodiments, a method is provided for creating a semantic model for submitting search queries thereto. The method includes an act of receiving data from one or more input sources in an entity and relationship capture service of a situational awareness engine. The method further includes an act of extracting entities and relationships between the entities in two or more extraction services, where the two or more extraction services include at least two of a table-to-graph service, an event-to-graph service, a sensor-to-graph service, a text-to-graph service, and an image-to-graph service. The method includes an act of generating a semantic model based on extracted data provided by the at least two extraction services, where the semantic model can receive a search query and respond to the search query based on the generated semantic model.

In one embodiment, the semantic model is a knowledge graph with nodes representing entities and edges representing relationships between the entities.

In one embodiment, the data comprises two or more disparate data types.

In one embodiment, the data comprises data from multiple multi-modal data sources.

In one embodiment, the method includes an act of receiving domain input on entities and relationships from a user via a user interface of a user computing device.

In one embodiment, the method includes an act of providing a portion of the extracted data to a user via a user interface of a user computing device for editing.

In one embodiment, the method includes an act of providing a labeling service for automatically reviewing the extracted data to identify disconnected components of data and providing details of the disconnected component to the user.

In one embodiment, the method includes an act of reconciling entities across the one or more input sources.

In one embodiment, the method includes an act of merging, with a fusion service of the situational awareness engine, two entities extracted from two of the one or more input sources upon determining that the two entities are the same.

In one embodiment, the method includes an act of determining a relationship between two related entities from two of the one or more input sources.

In one embodiment, the search query of the semantic model is for problem diagnosis upon the situation awareness engine detecting a problem.

According to various embodiments, a computing device is provided for generating a semantic model for receiving search queries. The computing device can include a situational awareness engine having two or more extraction services, where the two or more extraction services include at least two of consisting of a table-to-graph service, an event-to-graph service, a sensor-to-graph service, a text-to-graph service and an image-to-graph service. The computing device can further include a user interface that permits a user to review data extracted by the two or more extraction services. The situational awareness engine can include an entity and relationship capture engine for receiving data from a domain expert to aid the generation of a semantic model based on data extracted by the two or more extraction services.

By virtue of the concepts discussed herein, a tool is provided that improves upon the transfer of knowledge to a semantic model, such as a knowledge graph, for situational awareness. These concepts can provide an engine to extract data from disparate data sources having disparate data types and provide that data into the semantic model.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems and computerized methods of fusing multiple sources of data, such as expert knowledge, sensors, logs/reports, events, manuals, and the like, using a semantic model with the intent of providing situational awareness. The systems and computerized methods provide a technical improvement in the efficiency and accuracy of computer systems by gathering information from a plurality of sources of data, permitting a domain expert to access and correct information, and creating semantic models, such as knowledge graphs, to permit query of the gathered information. The systems and computerized methods can provide efficient use of such systems to provide situational awareness and problem diagnosis in various systems, such as those in manufacturing plants, airline operation, semiconductor manufacturing, oil and gas industry systems and the like.

Reference now is made in detail to the details illustrated in the accompanying drawings and discussed below.

Figure 1:
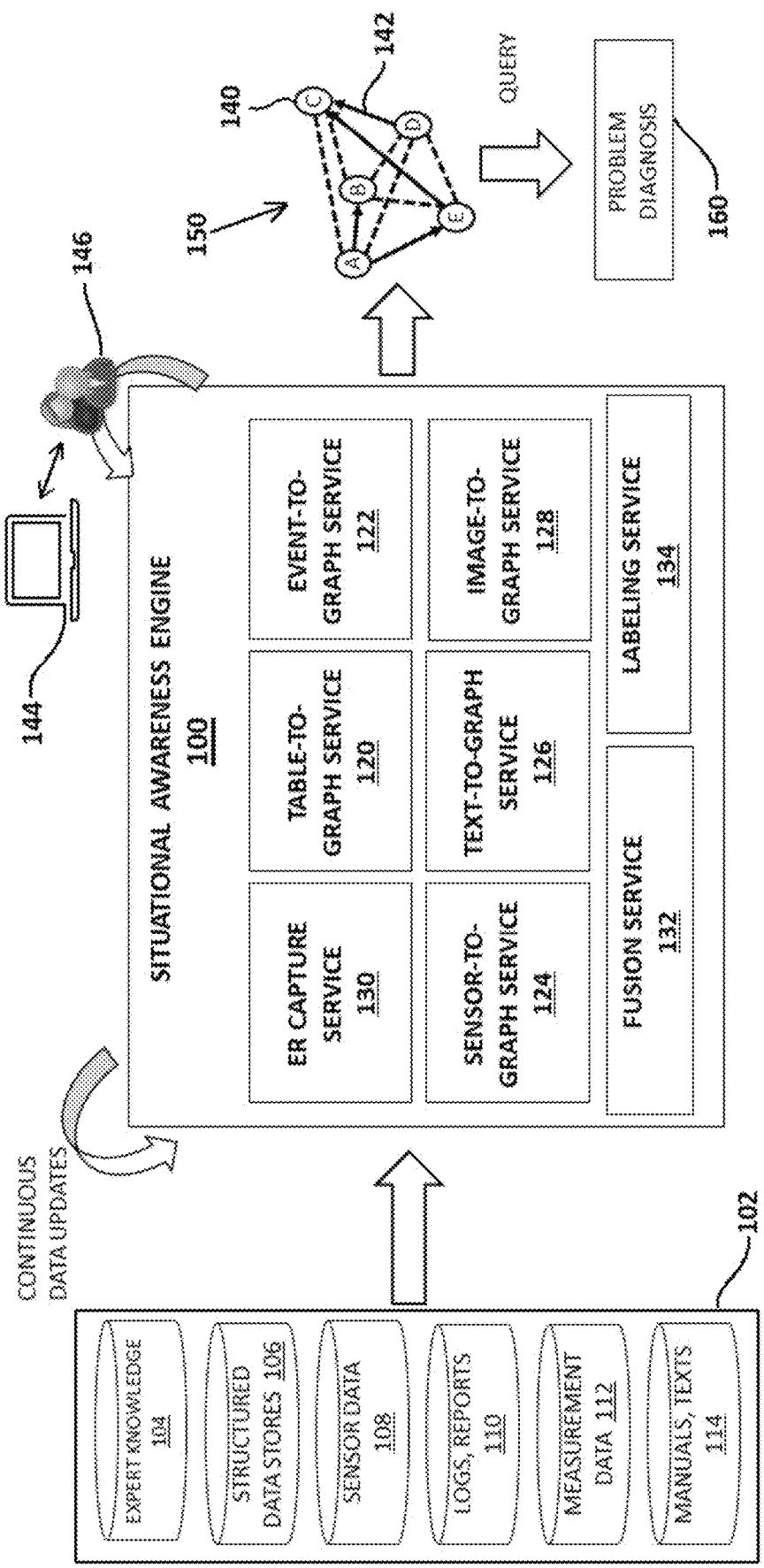
FIG. 1 is a graphical representation of methods for fusing multiple sources of data using a semantic model with the intent of providing situational awareness, consistent with an illustrative embodiment.

Referring to FIG. 1, a situational awareness engine 100 can receive data from a plurality of different input sources 102. These input sources 102 can include at least two or more disparate sources providing two or more disparate data types, where the data types can include, for example, text, graphs, images, tables, sensor data, detected events and the like. As non-limiting examples, the input sources 102 can include expert knowledge 104, structured data stores 106, sensor data 108, logs or reports 110, measurement data 112, manuals or texts 114, or the like.

The situational awareness engine 100 can include an entity and relationship (ER) capture service 130 to receive the data from the input sources 102 that are provided by the domain experts. The ER capture service 130 can receive domain input on entities and relationships of interest as provided into a user interface, as described below. Depending on the type of data being received into the engine 100 from the input sources 102, two or more extraction services can act on the data to discover entities 140 and/or relationships 142 therein. The situational aware engine can fuse the discovered entities 140 and relationships 142 into a semantic model 150. The extraction services can include a table-to-graph service 120, an event-to-graph service 122, a sensor-to-graph service 124, a text-to-graph service 126, and an image-to-graph service 128.

For example, the table-to-graph service 120 can review tabular data to discover entities and relationships based on schema and data within the tabular data. Such tabular data can include, for example, a table of equipment, with columns for each piece of equipment and rows for elements associated with each piece of equipment, such as identification number, tool code, location, lead operator, supplier, model number, serial number, or the like. The table-to-graph service 120 can include methods using correlation and covariance matrices, numerical limits, Chi-square test or Jenson-Shannon Distance (JSD) for numerical data and cosine similarities for word vectors across columns, concept similarities for textual data, and other techniques across columns to semi-automatically discover the relationships across tables and columns.

The event-to-graph service 122 can discover entities and relationships using event data analysis. Such event data may include, for example, alarms, alerts, and/or notifications regarding equipment, sensors, or the like. The event-to-graph service 122 can include methods to enhance the semantic model with the data associated with aperiodic events, such as alarms, to enable event-based queries of the whole system. The service can provide data to answer questions such as the components that went through this event at a given time, or the events that will most likely follow given the current event.

The sensor-to-graph service 124 can discover data driven relationships as a result of sensor data analysis. The sensor-to-graph service 124 includes clustering/connecting similar sensors using data similarity using one or more of the correlation computation methods such as: correlation or JSD over time; using the knowledge graph structure and applying node-to-vec embedding to find similar sensors. For root cause analysis, this can help in limiting the scope of search to a specific section of candidates using the knowledge graph. If a sensor fails, the service can determine which other sensors can be looked at instead, or which other sensors are prone to the same problem, or the service can identify one problematic sensor by comparing its values to other identified similar sensors.

The text-to-graph service 126 can discover entities and relationships using natural language processing (NLP) and dictionaries, for example. The text-to-graph service 126 can include methods to create domain specific language model using domain specific corpora-like manuals, wiki-data, and the like, and, using this model to extract entity and relationship from the logs reports and related material to associate the failures/problems to the specific entities, so the history of problems can be further processed (e.g., to show all the tools that had this problem, or the time at which these problems occurred) using the semantic model. The image-to-graph service 128 can analyze images to discover entities and relationships, for example by automatically processing the process flow diagrams, which identify relationships between various components of a system. Images might also be available of defects, process steps, equipment or material being processed, of the environmental conditions, and the like, which can be classified using one of the many standard image recognition methods, and semantic models can be enhanced using this information.

The situational awareness engine 100 can produce a set of auto-derived entities 140 and relationships 142. A graphical user interface 144 can present, to a human expert 146, the auto-derived entities 140 and relationships 142. Missing or uncertain entities 140 and relationships 142 that are most urgently needed to create the semantic model 150 can be identified and highlighted in the user interface 144 so as to elicit input from the expert to fill in, confirm or correct the information. The entities and relationships information and corrections elicited from the expert at the user interface 144 are applied to the auto-derived entities 140 and relationships 142, and the result is stored in a data store as the semantic model 150, such as a knowledge graph.

Suppose some or all of the various knowledge graph extraction services described above (e.g., ER capture service 130, table-to-graph service 120, event-to-graph service 122, sensor-to-graph service 124, text-to-graph service 126, and image-to-graph service 128) have produced a set of entities and/or relationships. A fusion service 132 may be applied to this produced set in order reconcile the entities to the extent possible. More specifically, this reconciliation may entail either a) establishing that an entity A and an entity B derived by different services should actually be regarded as the same entity; or b) establishing that an entity A and an entity B derived by different services are related in a specific way.

An example for both of the above reconciliation cases, in a semiconductor manufacturing use case, is described below. Assuming the situational awareness engine 100 has extracted the entity "Tools" (semiconductor use cases) from a table using the table-to-graph service 120, and the engine 100 has extracted both "Reported Tools" and "Events" that are in PowerPoint® or portable document format (pdf) event reports using the text-to-graph service 126, then the fusion service 132 can establish that either a) "Tools" and "Reported Tools" are the same entity and b) the entity "Tools" and "Events" has the relationship of, for example, "has failure".

Another example is that there may be a sensor entity with the name "wX199" found with the table-to-graph service 120. This sensor is part of the component "82T1818" or group "train 6". The component and the group can be extracted from the text-to-graph service 126, since they are mentioned in the workers' text logs. Using the fusion service 132, the sensor and the component should be considered related to each other.

In reconciliation case a), described above, entities A and B may be merged into a single node in the knowledge graph (semantic model 150). Merging two or more entities into a single node entails assigning them to the same unique node identifier, merging their properties, and merging their relationships.

Figure 4:
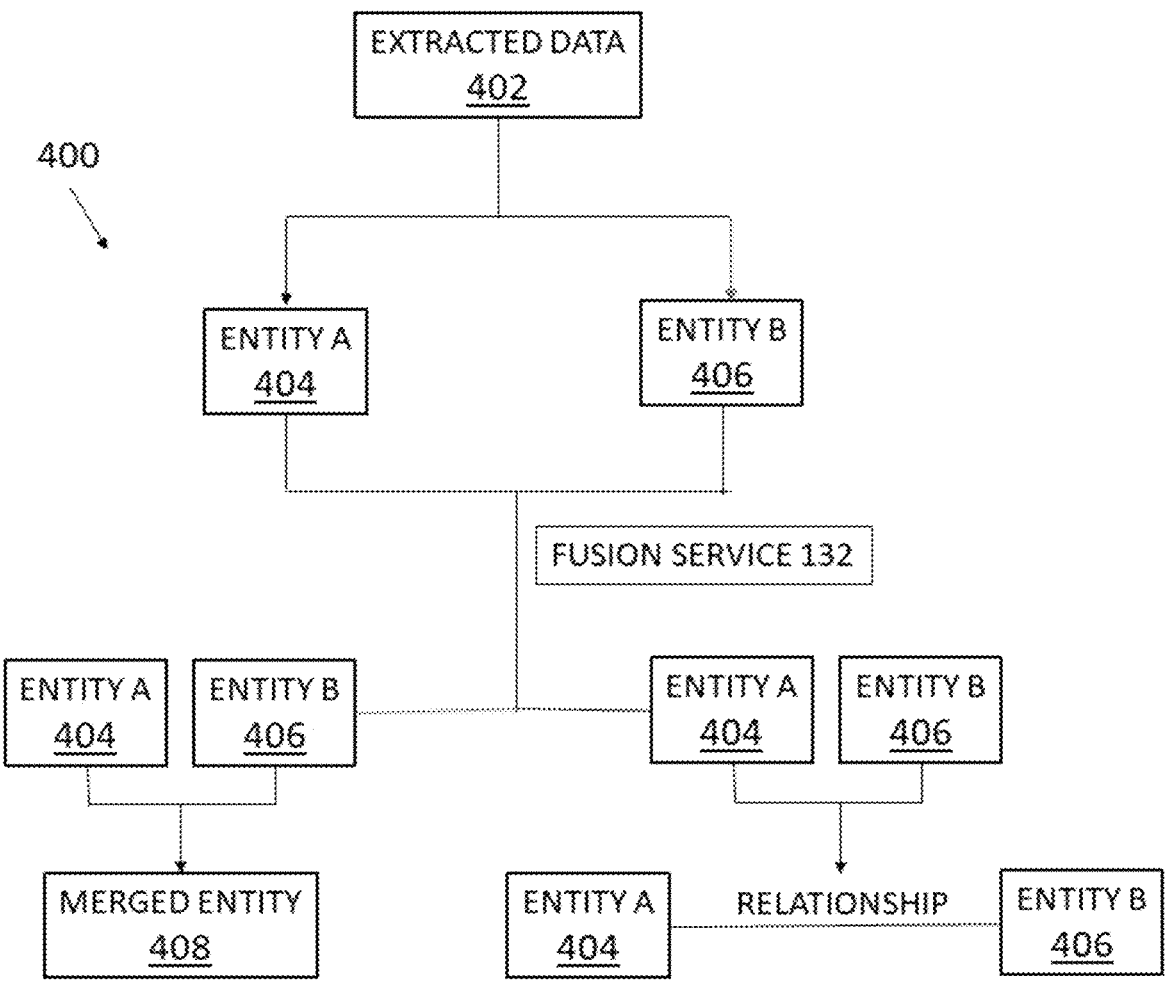
FIG. 4 is a flow chart showing use of a fusion service of the semantic model of FIG. 2.

One exemplary method 400, referring to FIG. 4, for merging the properties of two entities obtained from the extracted data 402, entity A 404 and entity B 406 into properties of a new merged node C 408 is as follows. The properties of C can be set to be equal to those of A. For each property of B, the fusion service 132 can determine whether that property is already defined for C. If it is determined in the previous step that the property is already defined for C, then the fusion service 132 can attempt to merge the property value of B into that of C. Various forms of merging include a) making a binary choice to either select the current value of C or replace that value with B, where the criteria might include taking minimum or maximum values, the age of the information on which the properties were derived, or compatibility with the values of other properties; b) taking the union of the values of B and C, if the type of the value is a list. If it is determined in the previous step that the property is not already defined for C, the fusion service 132 can add the property and its value to C.

Optionally, an effort can be made to discover whether properties that are named differently between C and B actually represent the same concept. In this case, if a name for the concept has been derived, the property could be renamed accordingly; if not, then the property name of either C or B could be used. In either case, the property values would be merged as described above.

In reconciliation case b) described above, a relationship between two entities might be inferred if their underlying properties appear sufficiently similar in type and/or content.

After the fusion service 132 has been applied, it may be the case that the semantic model 150, such as a knowledge graph where the set of entities 140 and relationships 142 are expressed as a collection of nodes representing the entities and labeled edges representing the relationships, is either incomplete or there are some uncertainties about conclusions that were drawn by either the extraction services (referring to collectively the services 120, 122, 124, 126, 128) or the fusion service 132. For such situations, aspects of the present disclosure can include the following procedure.

As discussed above, auto-derived entities and relationships can be presented to a human expert through a graphical user interface 144. Missing, incomplete or uncertain entities and relationships that are deemed most urgently needed to create a complete knowledge graph are identified and highlighted in the user interface 144 so as to elicit input from expert to fill in, confirm or correct the information.

To identify possibly missing relationships, the semantic model 150 (the knowledge graph) is analyzed for disconnected components of the graph, i.e., isolated clusters that share no edges with nodes outside the cluster. Algorithms involving depth-first or bread-first search can be employed to identify such clusters. While such isolated clusters may be legitimate, they may also be indicative of missing relationships that were not picked up by the extraction services. An analysis is performed on the content of the nodes and the relationships in each cluster and a similarity metric is applied to this information for all pairs. For any pairs of clusters for which the similarity exceeds a threshold, a representation of the two clusters is displayed in the graphical user interface 144 and a human is given an opportunity to indicate whether they should be related in some way by drawing and labeling one or more edges between one or more nodes in one cluster and one or more nodes in the other.

It may also be the case that the entity and relationship extraction services produced a probability or confidence measure associated with some of the inferred entities and relationship. For inferred entities or relationships that are below a specified threshold of certainty, aspects of the present disclosure can display the inferred information to the user and asks them to confirm or reject the inferred information.

In some cases, the knowledge pertaining to a given entity (node) or relationship (edge) may be incomplete. For example, most of the properties of a node or relationship might be known but the graph services were unable to identify a suitable label. In this case, aspects of the present disclosure provide a labeling service 134 that can highlight, in a graphical user interface such as user interface 144, nodes and edges for which labels are required, along with the properties that were extracted, and can solicit, from the user, a suitable label for each such node and edge.

The semantic model 150 may be used for problem diagnosis 160, where the semantic model 150 can be queried. For example, a high temperature alert in a given pump and a low flow notification may be queried into the semantic model 150 to provide a situational awareness determination to a user that, for example, pump 5 is experiencing a seal failure. While this example is quite simple, as the semantic model 150 is updated with more information, situational awareness of a plant, manufacturing facility, or the like, can be monitored and problems may be addressed even before they occur, thus improving the efficient operation of the plant. The semantic model 150 can be updated continuously as additional data is provided to the input sources 102 or as additional input sources are provided to the situational awareness engine 100.

Figure 2:
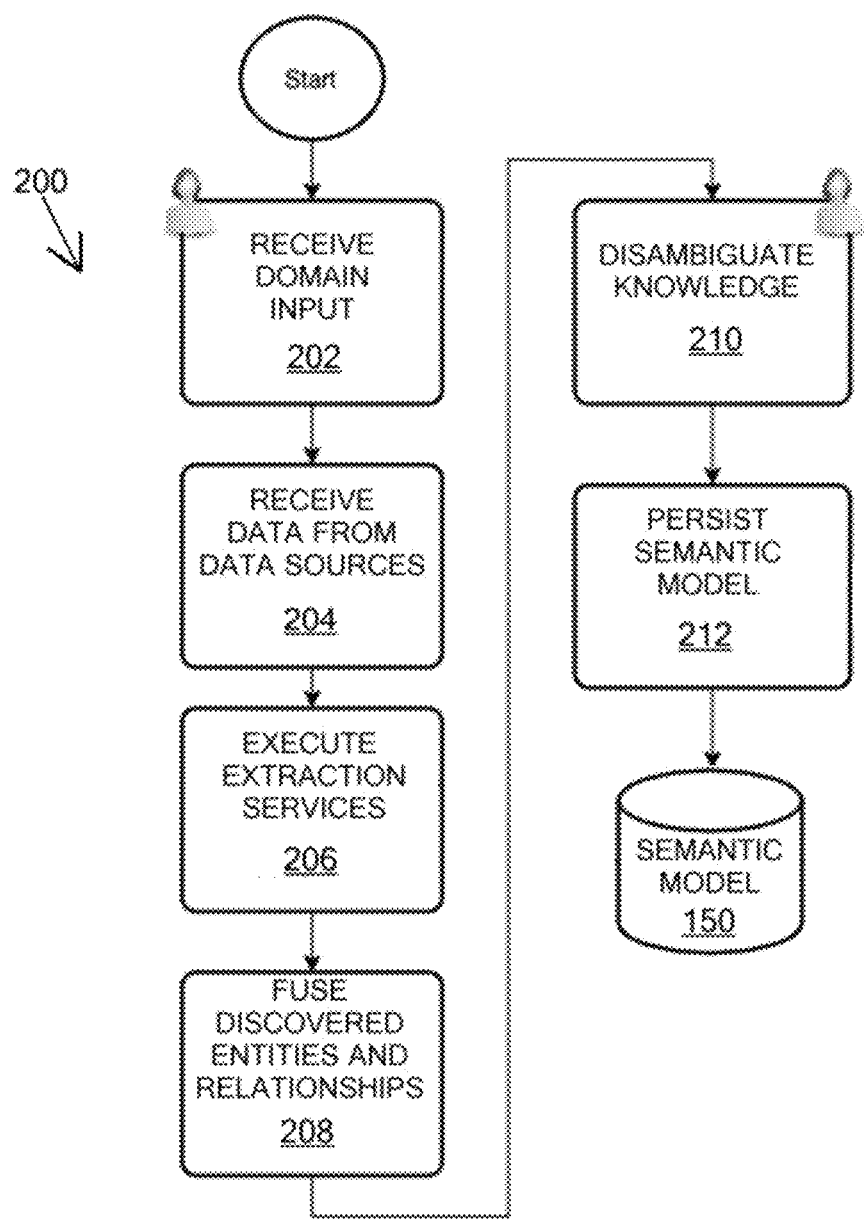
FIG. 2 is a flow chart showing a method for populating a semantic model for situational awareness, consistent with an illustrative embodiment.

Referring to FIG. 2, a flow chart 200 is provided that describes various acts in providing a semantic model, such as the semantic model 150 discussed above. An optional act 202 can include receiving domain input on entities and relationships of interest. This may be performed by a domain expert user, for example, and may be entered via a graphical user interface. An act 204 can include receiving domain specific heterogenous data from various sources, such as the input sources 102 discussed above. An act 206 can include executing a multitude of data discovery services (such as the extraction services 120, 122, 124, 126, 128, discussed above) to extract domain specific entities and relationships. An act 208 can include fusing the entities and relationships discovered in the act 206. An optional act 210 can include disambiguating the discovered knowledge using input from a domain expert. The act 210 may be used in conjunction with the fusion service 132 and the labeling service 134, discussed above. An act 212 may then persist the semantic model in a data store for use as a semantic model, such as semantic model 150, for answering queries and to provide situational awareness.

Figure 3:
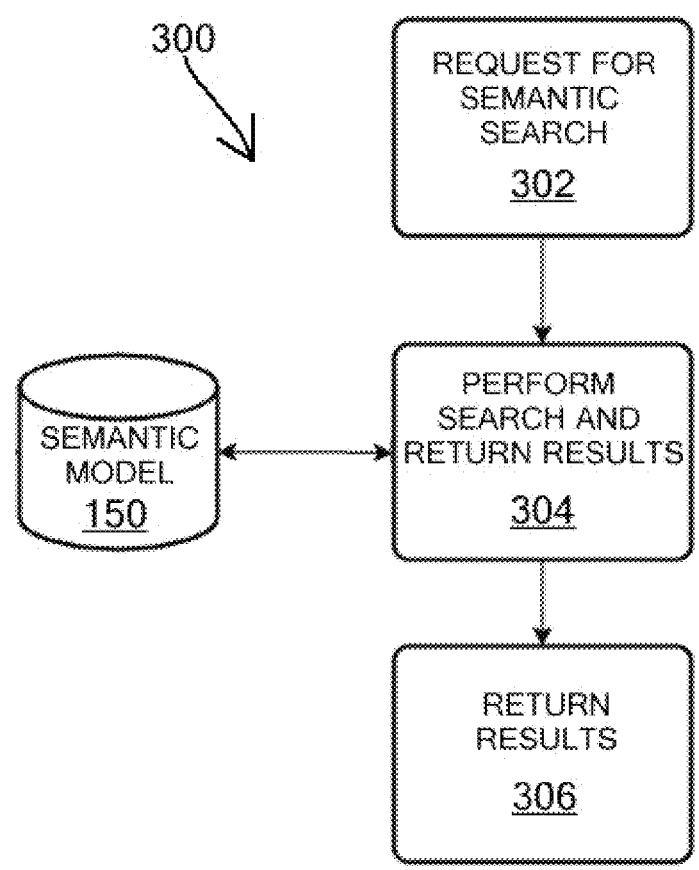
FIG. 3 is a flow chart showing use of the semantic model of FIG. 2 for performing system diagnosis, consistent with an illustrative embodiment.

Referring to FIG. 3, the semantic model 150 can be used as shown in flow chart 300. An act 302 can receive a request for a semantic search for problem diagnosis. The request may be user entered or may be automatically generated by a facility based on an alert, notification or the like. An act 304 can perform a search of the semantic model 150 and retrieve possible resolutions of the problem posed for diagnosis. An act 306 can then return the results to the user.

Figure 5:
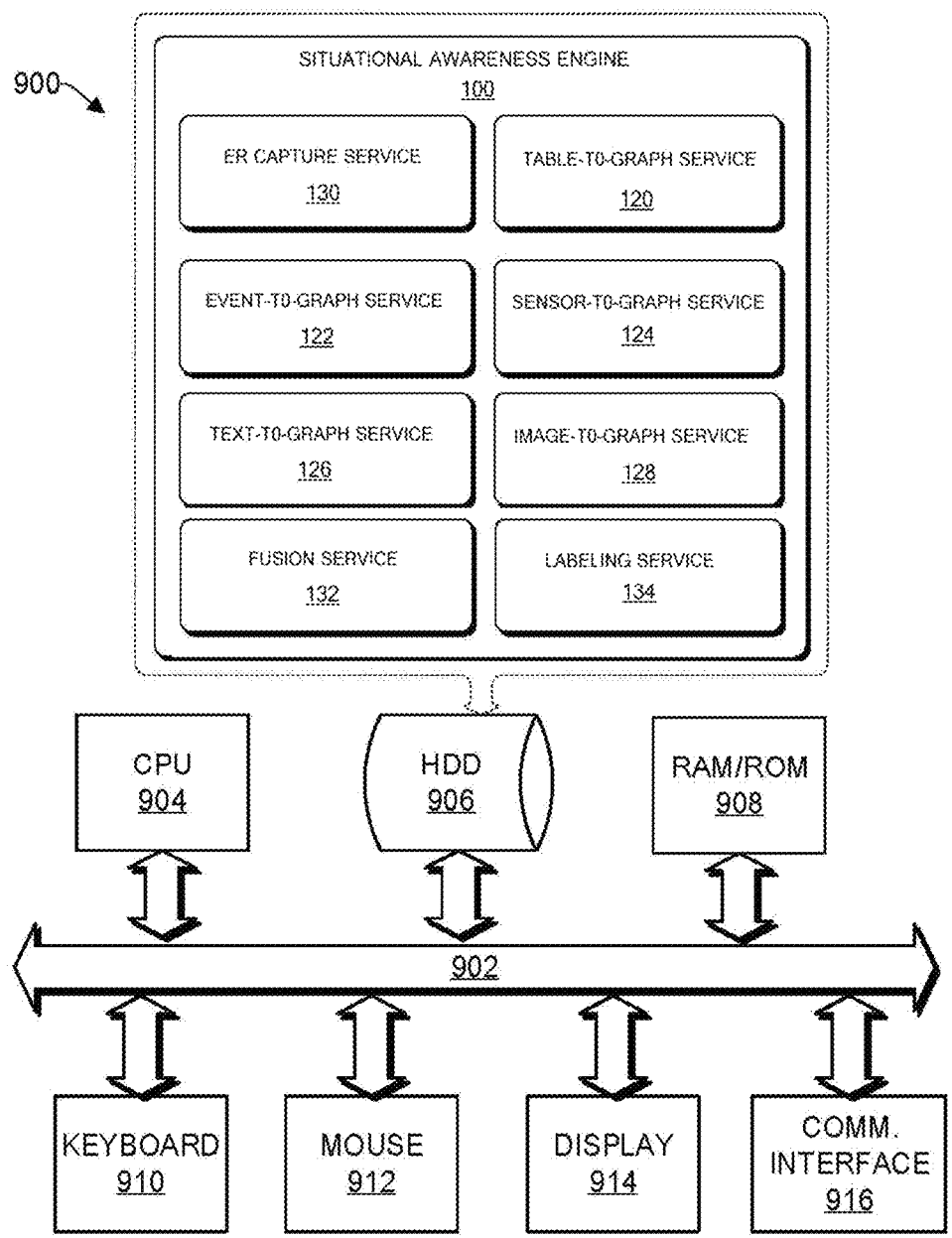
FIG. 5 is a functional block diagram illustration of a computer hardware platform that can be used to implement a particularly configured computing device that can host a situational awareness system consistent with an illustrative embodiment.

FIG. 5 provides a functional block diagram illustration of a computer hardware platform 900 that can be used to implement a particularly configured computing device that can host the situational awareness engine 100 for building the semantic model 150 discussed above. In particular, FIG. 5 illustrates a network, cloud-computing cluster or host computer platform 900, as may be used to implement an appropriately configured engine, such as the situational awareness engine 100 described above in FIG. 1.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902. The display 914 may be configured to provide the graphical user interface 144, as discussed above in FIG. 1.

In one embodiment, the HDD 906, has capabilities that include storing a program that can execute various processes, such as the engine 100, in a manner described herein. The engine 100 may have various modules configured to perform different functions. For example, there may be the ER capture service 130, the table-to-graph service 120, the event-to-graph service 122, the sensor-to-graph service 124, the text-to-graph service 126, the image-to-graph service 128, the fusion service 132 and the labeling service 134, as described above with respect to FIG. 1.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method, comprising:
   receiving data from one or more input sources in an entity and relationship capture service of a situational awareness engine;
   extracting entities and relationships between the entities in two or more different extraction services, the two or more different extraction services including at least two of a table-to-graph service, an event-to-graph service, a sensor-to-graph service, a text-to-graph service, and an image-to-graph service;
   upon identifying missing or uncertain entities and/or relationships to generate a semantic model by way of a knowledge graph, eliciting an input to correct the missing or uncertain entities and/or relationships;
   generating the semantic model based on fusion and labeling of extracted data provided by the at least two extraction services;
   reconciling entities, of the entities and relationships extracted by the two or more different extraction services, into a single node in the knowledge graph, upon determining that the entities should be regarded as a same entity, by assigning a same unique node identifier, merging their properties, and merging their relationships;
   receiving a search query; and
   responding to the search query based on the generated semantic model.

2. The computer implemented method of claim 1, wherein the semantic model is a knowledge graph with nodes representing entities and edges representing relationships between the entities.

3. The computer implemented method of claim 1, wherein the data comprises two or more disparate data types.

4. The computer implemented method of claim 1, further comprising receiving domain input on entities and relationships from a user via a user interface of a user computing device.

5. The computer implemented method of claim 1, further comprising providing a portion of the extracted data to a user via a user interface of a user computing device for editing.

6. The computer implemented method of claim 5, further comprising providing a labeling service for automatically reviewing the extracted data to identify disconnected components of data and providing details of the disconnected component to the user.

7. The computer implemented method of claim 1, further comprising merging, with a fusion service of the situational awareness engine, two entities extracted from two of the one or more input sources upon determining that the two entities are the same.

8. The computer implemented method of claim 1, further comprising determining a relationship between two related entities from two of the one or more input sources.

9. The computer implemented method of claim 1, wherein the search query of the semantic model is for problem diagnosis upon the situation awareness engine detecting a problem.

10. A computerized situational awareness system comprising:
a situational awareness engine having two or more different extraction services, where the two or more different extraction services include at least two of a table-to-graph service, an event-to-graph service, a sensor-to-graph service, a text-to-graph service and an image-to-graph service;
a user interface permitting a user to:
review data extracted by the two or more extraction services;
and receive input to correct missing or uncertain entities and/or relationships upon the situational awareness engine identifying missing or uncertain entities and/or relationships in a knowledge graph;
an entity and relationship capture engine of the situational awareness engine receiving data from one or more input sources;
a fusion engine configured to reconcile entities extracted by the two or more different extraction services into a single node in the knowledge graph, upon determining that the entities should be regarded as a same entity, by assigning a same unique node identifier, merging their properties, and merging their relationships; and
a semantic model generated by the situational awareness engine based on fusion and labeling of data extracted by the two or more extraction services.

11. The computerized situational awareness system of claim 10, wherein the semantic model is a knowledge graph with nodes representing entities and edges representing relationships between the entities.

12. The computerized situational awareness system of claim 10, wherein the one or more input sources provides two or more disparate data types.

13. A non-transitory computer readable storage medium tangibly embodying a computer readable program code having computer readable instructions that, when executed, causes a computer device to carry out a method of improving computing efficiency of a computing device for problem solving and reasoning, the method comprising:
receiving data from one or more input sources into a situational awareness engine;
capturing the data in an entity and relationship capture service;
providing the data to one or more extraction services, the situational awareness engine including at least two different extraction services selected from the group consisting of a table-to-graph service, an event-to-graph service, a sensor-to-graph service, a text-to-graph service and an image-to-graph service;
upon identifying missing or uncertain entities and/or relationships to generate a semantic model by way of a knowledge graph, eliciting an input to correct the missing or uncertain entities and/or relationships of the knowledge graph;
generating the semantic model based on fusion and labeling of extracted data provided by the at least two extraction services; and
merging, with a fusion service of the situational awareness engine, two entities extracted from two of the one or more input sources into a single node in the knowledge graph, upon determining that the two entities are the same by assigning a same unique n ode identifier, merging their properties, and merging their relationships.

14. The non-transitory computer readable storage medium of claim 13, wherein the semantic model is a knowledge graph with nodes representing entities and edges representing relationships between the entities.

15. The non-transitory computer readable storage medium of claim 14, wherein the execution of the code by the processor further configures the computing device to perform an act comprising reconciliating entities across the one or more input sources.

16. The non-transitory computer readable storage medium of claim 13, wherein the execution of the code by the processor further configures the computing device to perform an act comprising providing a portion of the extracted data to a user via a user interface for editing.

17. The non-transitory computer readable storage medium of claim 16, wherein the execution of the code by the processor further configures the computing device to perform an act comprising providing a labeling service for automatically reviewing the extracted data to identify disconnected components of data and providing details of the disconnected component to the user.

18. The non-transitory computer readable storage medium of claim 13, wherein the execution of the code by the processor further configures the computing device to perform an act comprising performing a search of the semantic model for problem diagnosis.

* * * * *